W. MORRISON.
SECONDARY BATTERY.
APPLICATION FILED JUNE 8, 1903. RENEWED DEC. 9, 1907.
900,571.  Patented Oct. 6, 1908.
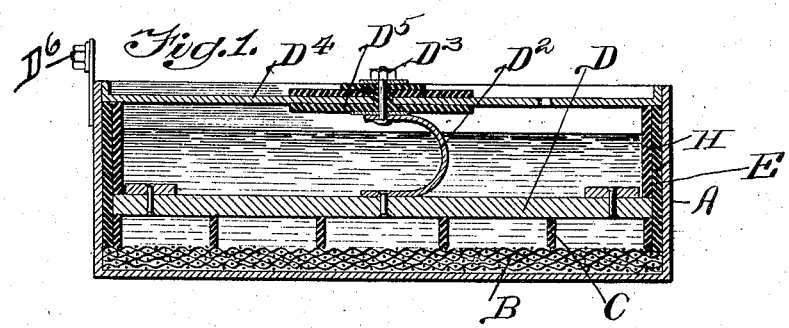
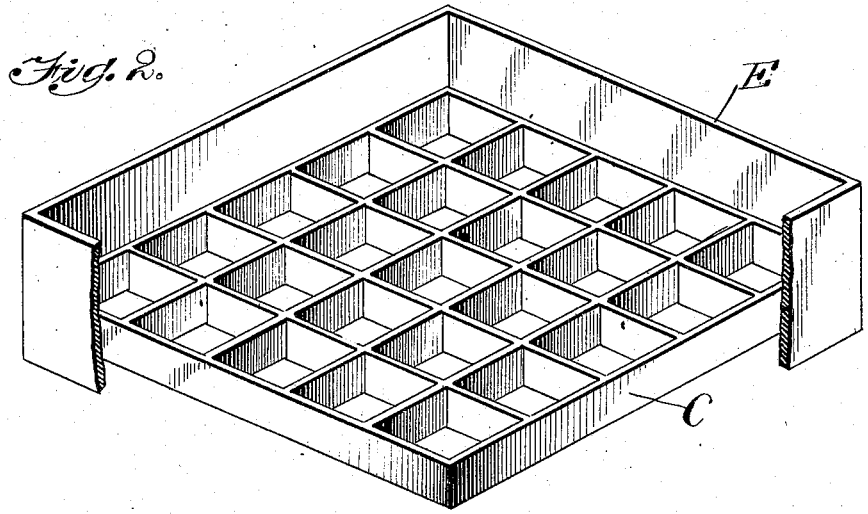
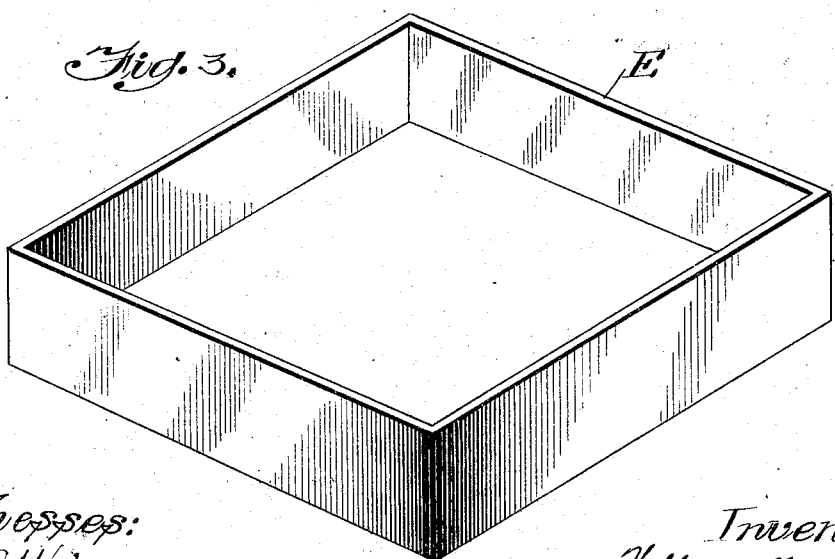

UNITED STATES PATENT OFFICE.

WILLIAM MORRISON, OF CHICAGO, ILLINOIS.

SECONDARY BATTERY.

No. 900,571.　　　Specification of Letters Patent.　　　Patented Oct. 6, 1908.

Application filed June 8, 1903, Serial No. 160,645. Renewed December 9, 1907. Serial No. 405,747.

*To all whom it may concern:*

Be it known that I, WILLIAM MORRISON, a citizen of the United States of America, and resident of Chicago, Cook county, Illinois, have invented a certain new and useful Improvement in Secondary Batteries, (Case B,) of which the following is a specification.

My invention relates to certain improvements in that type of battery in which there is an alkaline solution and zinc as one of the active elements.

The object of my present invention is to provide an insulator or insulating member which shall insulate the sides of the cell from the solution and from the negative electrode. This improvement constitutes a feature of invention to be used in connection with the character of battery described and claimed by me in an application filed concurrently herewith. Case, Serial Number 160,645.

Reference may now be had to the accompanying drawings in which—

Figure 1 is a cross-sectional view through the complete battery, showing the insulating member in position. Fig. 2 is a perspective view of the same. Fig. 3 is a perspective view of the insulating band shown about the insulating protector.

Although I have described fully and completely the character of battery with which my invention is to be employed in an application to which I have previously referred, I will herein describe generally the essential elements of construction of that battery in order to demonstrate the purpose of the said insulator constituting my present invention.

I preferably employ a metal cell which may be of copper or other suitable metal, and is designated at A. Within this metal cell and disposed in a substantially horizontal plane at the bottom thereof, is a positive electrode B made up of a number of superimposed screens, which electrode is fully described and its functions particularly pointed out in the said application to which I have made reference. Above this positive electrode is the insulating protector C, which I have described and particularly claimed in another application filed concurrently herewith. Resting upon the insulating protector is a negative electrode D of a suitable character, and this negative electrode is connected by a conductor $D^2$ with a binding post $D^3$ extended through the cover $D^4$ and the insulating band E is between the sides of the cell and the insulating protector.

Resting at its lower edges upon the positive electrode, and so adjusted in place as to be adjacent to the inner exposed sides of the cell A, is the insulator E which constitutes my present invention. This insulator is a band of insulating material, as shown in Fig. 3, which extends completely around the interior sides of the cell, and protects the inner sides of said cell at all exposed points. As the cover $D^3$ bears upon the top edges of the said insulator and as its lower edges bear upon the positive electrode, it serves also the purpose of keeping the said electrode in place. Also is provided a second or inner insulator, which is designated at H, and extends about the interior of the cell above the negative electrode. This inner insulator is disposed between the cover and the negative electrode. When, therefore, the cover is pressed down and soldered in place, the insulator E bears upon the positive electrode and the inner insulator H in bearing upon the top of the negative electrode causes the latter to press downward upon the insulating protector C, which latter being disposed between the negative and positive electrodes serves to bind the latter together and maintain the positive electrode in place. It will be observed that this insulating band E insulates the sides of the cell from the electrical action of the battery during the charge and discharge.

As stated in an application to which I have previously referred, the object of my invention there claimed is to concentrate the deposit of zinc upon the electrode at the bottom of the cell, which zinc when so deposited is in a position in which gravity does not tend to remove the zinc from this support. I have found that the metal cell affords the most conveninet means for embodying my invention as described in said application, although it is not absolutely essential to the same, but when used means should preferably be provided for preventing the deposit of the zinc upon the sides of the cell, which in the jar of the battery is liable to fall and cause short circuiting and other difficulties. The insulating band also, it will be observed, insulates the negative electrode from the sides of the metal cell, and also from the positive electrode when the latter is in contact with the metal cell.

Having thus described my invention what I claim as new and desire to secure by Letters-Patent is:—

1. In a reversible electric galvanic battery in which there is an alkaline solution and zinc is one of the positive active elements, an electrode disposed in a substantially horizontal plane at or near the bottom of the cell, and an insulating band extending about and protecting the inner surfaces of the sides of the cell against electrical action.

2. In a reversible electric galvanic battery in which there is an alkaline solution and zinc is one of the active positive elements, a positive electrode disposed in a substantially horizontal plane at or near the bottom of the cell, and an insulating band extending about the interior sides of the cell and resting at its lower edges upon the positive electrode.

3. In a reversible electric galvanic battery in which there is an alkaline solution and zinc is one of the active elements, and a metal cell, an electrode disposed in a substantially horizontal plane at or near the bottom of the metal cell, and an insulating band extending about and protecting the inner side surfaces of the metal cell against electrical action.

Signed by me at Chicago, Cook county, Illinois, this 6th day of June, 1903.

WILLIAM MORRISON.

Witnesses:
CHAS. C. BULKLEY,
WM. A. HARDERS.